(12) United States Patent
König et al.

(10) Patent No.: US 8,380,505 B2
(45) Date of Patent: Feb. 19, 2013

(54) SYSTEM FOR RECOGNIZING SPEECH FOR SEARCHING A DATABASE

(75) Inventors: Lars König, Ulm (DE); Andreas Löw, Ulm (DE); Udo Haiber, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1131 days.

(21) Appl. No.: 12/258,338

(22) Filed: Oct. 24, 2008

(65) Prior Publication Data

US 2009/0112593 A1    Apr. 30, 2009

(30) Foreign Application Priority Data

Oct. 24, 2007  (EP) .................................. 07020821

(51) Int. Cl.
  *G10L 15/04* (2006.01)
(52) U.S. Cl. ............ 704/251; 704/254; 704/257; 704/9; 704/10; 379/88.17; 379/88.02
(58) Field of Classification Search .................. 704/251, 704/254, 257, 255, 275, 270.1, 243, 231, 704/9, 270, 242, 10, 7, 245, 256, 256.7; 379/88.17, 379/88.02, 88.01
  See application file for complete search history.

(56) References Cited

U.S. PATENT DOCUMENTS

| | | | |
|---|---|---|---|
| 6,882,970 B1* | 4/2005 | Garner et al. ................. | 704/236 |
| 7,240,003 B2* | 7/2007 | Charlesworth et al. ....... | 704/254 |
| 7,401,019 B2* | 7/2008 | Seide et al. ................... | 704/254 |
| 7,689,408 B2* | 3/2010 | Chen et al. ........................ | 704/8 |
| 7,725,307 B2* | 5/2010 | Bennett ............................ | 704/9 |
| 2002/0152207 A1* | 10/2002 | Lyudovyk et al. ............... | 707/6 |
| 2004/0148164 A1* | 7/2004 | Baker .......................... | 704/231 |
| 2005/0080614 A1* | 4/2005 | Bennett ........................... | 704/9 |

OTHER PUBLICATIONS

Tian, et al.; On Text-Based Language Identification for Multilingual Speech Recognition Systems; Nokia Research Center, Speech and Audio Systems Laboratory; Tampere, Finland; pp. 501-504.
Ohtsuki, et al.; Unsupervised Vocabulary Expansion for Automatic Transcription of Broadcast News; NTT Cyber Space Laboratories and NTT Cyber Solution Laboratories, NTT Corporation; Kanagawa, Japan; ICASSP 2005; pp. 1021-1024.

* cited by examiner

*Primary Examiner* — Vijay B Chawan
(74) *Attorney, Agent, or Firm* — Sunstein Kann Murphy & Timbers LLP

(57) ABSTRACT

A system is provided for recognizing speech for searching a database. The system receives speech input as a spoken search request and then processes the speech input in a speech recognition step using a vocabulary for recognizing the spoken request. By processing the speech input words recognized in the speech input and included in the vocabulary are obtained to form at least one hypothesis. The hypothesis is then utilized to search a database using the at least one hypothesis as a search query. A search result is then received from the database and provided to the user.

25 Claims, 8 Drawing Sheets

SYSTEM FOR RECOGNIZING SPEECH FOR SEARCHING A DATABASE

RELATED APPLICATIONS

This application claims priority of European Patent Application Serial Number 07 020 821.0, filed on Oct. 24, 2007, titled METHOD AND SYSTEM FOR RECOGNIZING SPEECH FOR SEARCHING A DATABASE, which application is incorporated in its entirety by reference in this application.

BACKGROUND OF THE INVENTION

1. Field of the Invention

The present invention relates to a method and system for recognizing speech for searching a database, where a search request can be entered by voice.

2. Related Art

Conventional speech recognition systems are being used for a range of applications. Speech recognition is used to allow a user to enter a voice command for controlling an operation of a device, such as a telephone or a navigation system. Conventional speech recognition systems also include speech recognition software that can be run on a computer system, such as Dragon® NaturallySpeaking (which is a registered trademark of Nuance Communications, Inc.), which is software used to dictate text or to control functions of the computer. As such, the program can be used to navigate a web browser by speech, and accordingly, a search query may be entered into the web browser by speech. In this manner, a database of a search engine may be searched by speech input. Yet, there are several problems using conventional speech recognition systems to search databases by voice.

Conventional speech recognition systems only recognize words that are included in their vocabulary. The vocabulary is generally rather limited, e.g., some 10,000 words on conventional systems, and up to 500,000 words on advanced systems. Yet, larger vocabularies require more time to search the vocabulary, and more resources are required in the form of memory and processing power. Besides being limited in size, vocabularies often lack specialized expressions, names of places and persons, and other words not used in the colloquial language. As a result, many entries that may be found in a database cannot be accessed by voice using a conventional speech recognition system, as these entries are not included in the vocabulary of such a system. Examples of such databases are a collection of music files, of which artists or song titles are not comprised in the vocabulary, points of interest stored in a navigation system, addresses and names of persons in a phone book or in an Internet database, and the like. If the user wants to search for a word in the database not included in the vocabulary, the speech recognition system will either select a word from its vocabulary most closely resembling to the word, or simply ignore the word. As a result, conventional speech recognition systems provide very limited possibilities of searching databases.

If the structure of the database is known, e.g., in a music collection, where song titles and artists are known to the system, this data may be prepared for speech recognition. Yet, this process is often very time consuming and not efficient for large databases. The structure of other databases is unknown, such as a database accessed over the Internet, and accordingly, their entries cannot be added to the vocabulary of a speech recognition system.

Further problems may arrive from multilingual search requests, e.g., when searching for song titles and artists or when searching for web pages. Furthermore, the database may contain orthographic alternatives of a word of the search request, or plural alternatives may exist for the pronunciation of a word of a database entry. These problems result in that the database entry that is requested by the user will not be found using a conventional speech recognition system. These problems may also occur in combination. A user may, for example, enter the German word "die" as a spoken search request; yet, the system may only deliver search results for the alternative of the English word "die". Thus, conventional speech recognition systems do not enable a user to extensively search a database, particularly not if multilingual entries are included in the database.

Accordingly, a need exists to provide an improved method and system for searching a database by speech input.

SUMMARY

According to one example of an implementation, a system for recognizing speech for searching a database is provided. The system includes a speech recognition unit for detecting a search request of a user in form of a speech input. The speech recognition unit is formed to process the recognize the speech input and to obtain at least one hypothesis representative of the speech input that includes recognized words and pseudo-words not recognized as words. The system further includes database as well as a search unit for searching the database using the at least one hypothesis as a search query. A list of search results is obtained from the search unit and provided to the user.

A method of recognizing speech for searching a database is also provided. In on example of an implementation of the method, when a user enters a search request as a speech input and the speech input is processes in a speech recognition step, where at least one hypothesis is obtained comprising recognized words and pseudo-words not recognized as words. The hypothesis is then utilized as a search query to search the database, where a list of search results is obtained.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
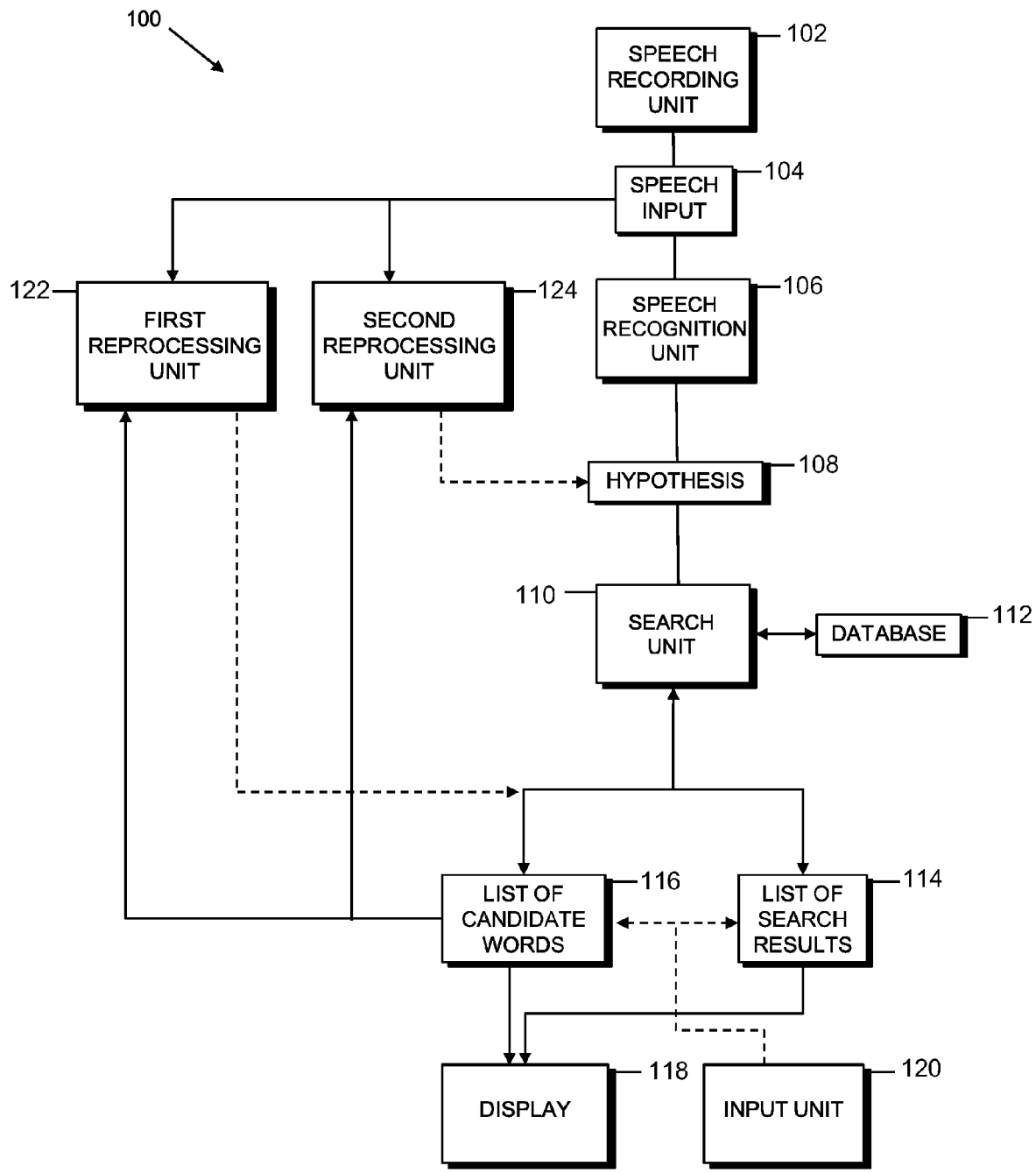
FIG. 1 is a schematic diagram of one example of an implementation of a speech recognition system for searching a database.

FIG. 1 is a schematic diagram of one example of an implementation of a system 100 for recognizing speech for searching a database. As illustrated, the system 100 may include a speech recording unit 102 and speech input unit 104 for recording a spoken search request. The system 100 may further include a speech recognition unit 106, hypothesis 108 component, a search unit 110 and database 112 for generating search results based upon the spoken search request. The system 100 further includes modules for storing a list of search results 114 and a list of candidate words 116 and a display 118 and input unit 120 to allow a user to view and select, delete or devalue the generated search results or candidate words. The system 100 further includes a first reprocessing unit 122 and a second reprocessing unit 124 for further refining the search results, as described below.

In the illustrated example, the system 100 includes a speech recording unit 102 for detecting a search request spoken by a user. The speech recording unit 102 may be formed at least partially of software for detecting speech signals from, for example, an analog to digital (AD) converter. The speech recording unit 102 may also include a microphone and the AD converter, in addition to, or in lieu of the software. A user may enter a search request into the system 100 by speaking the search request and the speech recording unit 102 records the search request. In some implementations, the speech recording unit 102 may digitize the request so that a speech input 104 may be obtained in the form of a digitized signal. The speech input 104 may be stored in a memory, such as a random access memory, or some other kind of memory. The speech input 104 is then supplied to a speech recognition unit 106. The speech recognition unit 106 is formed so as to recognize the speech input 104 based on known or probable words using a statistical or rule based model. The speech recognition unit 106 is configured so that it can also identify and classify unknown words (pseudo-words), utilizing classifying methods to obtain pseudo-word properties, e.g., in the form of vowels, consonants, syllables, grapheme, word separators and similar properties. The speech recognition unit 106 may also recognize semantic information in the speech input 104. The speech recognition unit 106 then forms a hypothesis 108, which may include the recognized words, the pseudo-words, pseudo-word properties, semantic information, and a measure of confidence, e.g., for the recognized words or the pseudo-words. The speech recognition unit 106 may generate a plurality of hypotheses 108, e.g., including alternatives of words or pseudo-words. The one or more hypothesis 108 may be stored in a memory, such as an internal random access memory, or another kind of memory, such as a hard drive, a flash memory or the like.

The hypothesis 108 is then supplied to a search unit 110. The search unit 110 processes the hypothesis 108 delivered by the speech recognition unit 106. The search unit 110 searches a database 112 using the hypothesis 108 as one or more search queries. The database 112 may contain database entries and database data, and the database entries may be indexed so that they can be easily found. If the database is, for example, a database of music files, the song titles and artist names of the music files in the database may be extracted and indexed to form a list of database entries, which can then be searched. The search unit 110 also searches the database 112 for pseudo-words included in the hypothesis 108. The pseudo-words of the hypothesis 108 may not be proper words, and, as such, may not be included in the database 112, as a result of which it may be desirable to process the database entries and the pseudo-words to obtain search results. The search unit 110 may, for example, estimate the language of the database entries, so that these can be further processed.

Estimating the language of the search request may be facilitated by making use of the context of the words in the search request and/or in the database entries. This may be done by using different speech models for different languages. The language may also be determined when processing the speech input using e.g., HMM models, for example, by using whole word models for different languages or by using phoneme models for different languages. On the other hand, the language of the database entries may be determined, e.g., by comparing the entries to dictionaries of different languages. The determined language may then be used to load the appropriate speech models and vocabulary for recognizing a search request for a search in this database. The language of the search request may also be determined in other ways, e.g., by the system language of the database system selected by the user, or a general user setup. The knowledge of the language of the search request can be used to narrow the database entries that have to be searched in a data base comprising entries in a plurality of languages, such as the Internet or a music database, or a location database of a navigation system.

The system may then generate orthographic and/or pronunciation alternatives of the database entries. This may also be done in a two-step process. The search unit 110 may, for example, send a search query to an external database 112, such as an Internet database. A search engine, such as Google® or Yahoo! ® (which are registered trademarks of Google, Inc. and Yahoo!, Inc., respectively) may then, for example, deliver a number of search results already including autographic alternatives and/or an estimation of the language. Using these primary results, the search unit 110 may then generate pronunciation alternatives of the database entries delivered by the search engine, and may then derive properties of these database entries and entry alternatives. Such properties may again be a sequence of vowels and consonants, grapheme, and other similar properties. The search unit 110 may then compare properties of the pseudo-words of the hypothesis 108 with the properties of the entry alternatives. This allows recognition of database entries including the pseudo-words, even though the pseudo-word was not recognized by the speech recognition unit 106.

The search unit 110 may furthermore evaluate the semantic information of the hypothesis 108 delivered by the speech recognition unit 106. The semantic information may, for example, be used to refine the search. It may either be directly delivered to the database 112 in a search query, or the database entries delivered by the database 112 may be singled out according to the semantic information. As a result, the search unit 110 delivers a list of search results 114, which may again be stored in an internal memory. The search result in the list 114 may have a different relevance, meaning that they reflect the hypothesis 108 more or less well.

The identifying of semantic information may be performed at different stages, e.g., after recognizing words, after forming the hypothesis, or after forming the search query. Semantic information may, for example, relate to a date, a time, a place, and the like. Identifying semantic information can relate to both identifying the words in the search request containing semantic information and identifying the semantic information itself, i.e., the meaning of the words containing the semantic information. Yet, it may also relate only to one or the other. For example, in the search request "Search for jazz concert today at destination", the word "jazz concert" may be a pseudo-word, whereas it is identified that the words "today" and "destination" comprise semantic information. The semantic information itself may then be identified, e.g., the meaning of the word "today", i.e., today's date, and the meaning of the word "destination", i.e., the name of the place the user is currently travelling to. A search may then be performed taking into account the current date and the place name of the destination. As such, results desired by the user may be obtained, whereas a search simply for the words "today" and "destination" will not deliver any useful results.

The search in the database 112 may, in most cases, deliver a list of one or more search results 114. The search results can be weighted in the list of search results, and the search results are provided to the user according to their weighting. The search results may be weighted according to their relevance. The search request may, for example, contain several words, for example a name, a place, and a time, and database entries will be found including all or only a few of the words of the search request. The search results may be weighted so that they are displayed according to the number of words of the search request they comprise, i.e., the result matching most words in the search request is displayed first. The weighting may furthermore consider the proximity of the words in the search request to words in the search results, for example in cases where a number of hypotheses 108 are used, or where a number of alternatives are used. A measure of proximity may be determined for this purpose, indicating how much a word of the search request has to be changed in order to arrive at a hypothesis or alternative comprised in a search result. Search results including words identical to words of the search request may be displayed first, whereas search results including words that are an alternative of an unlikely hypothesis 108 may be displayed further down the list of search results. The user is then provided with an ordered list of search results, in which the best matching search results are located on top of the list. The list can be provided to the user by displaying the list in form of written entries on a display, such as an LCD screen or the like.

As set forth above, a search result generally corresponds to a database entry including one or more of the words or pseudo-words of the hypothesis 108. The search result may thus be rated, e.g., by counting the words of the hypothesis 108 included in the search result, or by a measure of proximity between the words of the hypothesis 108 and the words in the search result. According to the rating, the search results may be weighted in the list 114, with better matching search results or search results with a higher relevance being further up the list 144. The list of search results 114 may furthermore include the words found in each search result, or the words identified as words corresponding to the pseudo-words of the hypothesis 108. The search unit 110 furthermore generates a list of candidate words 116, which is again stored on an internal memory. The search unit 110 identifies candidate words as words of database entries that may correspond to pseudo-words of the hypothesis 108. It may identify candidate words by, for example, comparing the properties of the pseudo-words with the properties of database entries. Yet, it may also compare the search results with the pseudo-words to find words in the search results most likely corresponding to the pseudo-words. A candidate word is thus associated with a pseudo-word, and several candidate words may be found for a pseudo-word. The list of candidate words 116 as well as the list of search results 114 are then provided to the user on a display 118, which may have the form of an LCD screen, or a CRT, a head-up display, or the like. The found words included in the list of search results 114 may also be provided to the user on the display 118, and it is optional to provide the list of candidate words 116. The list of search results 114 may be provided with the highest rated or weighted search results on top, so that the user can access the most relevant search results first.

The user may then decide that some words, e.g., candidate words, were wrongly identified and are not desired. Accordingly, the search unit 110 may have delivered a list of search results 114 that does not include the appropriate database entries requested by the user. The user may thus use an input unit 120 to exclude or devaluate search results in the list of search results 114. Input unit 120 may be in the form of a control element, such as a mouse, a button, a rocker, or a turn push button or the like, or in the form of a speech input unit. The user may, for example, select a search result in the list of search results 114 and devaluate it, meaning that its weighting is reduced, so that it is shifted further down the list 114. The user may also exclude a search result, meaning that the search result is removed from the list 114. The search unit 110 may access the modified list of search results 110 to refine the search or perform a new search according to the search results devaluated or excluded by the user.

Similarly, the user may select particular found words or candidate words that the user may want to exclude or devaluate. The search unit 110 may have delivered a number of alternatives for a pseudo-word included in the hypothesis 108, and some of these alternatives, which are displayed in the list of candidate words 116, may not be wanted by the user. The user may then exclude these candidate words from the list of candidate words 116 by using the input unit 120. Furthermore, the user may also want to exclude some of the found words included in the list of search results 114 from the search. The search unit 110 may therefore access the list of candidate words 116 and/or the list of search results 114 to perform a new search using the remaining candidate words and/or found words in a search query. Accordingly, a new list of search results 114 is generated by the search unit 110 and provided to the user via the display 118. The user is thus provided with a method of improving the obtained search results. Furthermore, the user may also extend the list of search results 114 or the list of candidate words 116 by entering new words for a new search request, e.g., by speech.

According to another aspect of the invention, the search results obtained by searching the database 112 may be used for a recursive processing. Candidate words may be identified in the list of search results as most probable words corresponding to the pseudo-words. The database may not contain a pseudo-word of the search query, yet, database entries can be found comprising words similar to the pseudo-word by using one of the above-described methods, e.g., by comparing pseudo-word properties to properties of database entries. A number of words may be obtained that are similar to the pseudo-word, and these may have different probabilities of corresponding to the pseudo-word. The most probable words of these pseudo-words are then identified as candidate words. This may be done by obtaining a measure of similarity between the obtained words and the pseudo-words and taking words above a certain similarity threshold as most probable words. An extended vocabulary may then be provided comprising the candidate words. As the candidate words correspond to the pseudo-words, they will generally not be comprised in the regular vocabulary. A vocabulary may also be provided comprising only words included in the search results from the database 112.

In one example, words in the speech input 104 may be recognized using the extended vocabulary, and the list of search results 114 mis reordered taking into account the recognized words, where a new list of search results 114 is obtained. Using the extended vocabulary, words in the speech input 104 may be recognized that were not recognized previously by the speech recognition unit 106. By processing the speech input 104 another time to recognize words using the extended vocabulary, the candidate word best corresponding to a former pseudo-word can be identified. This may, for example, be achieved using a speech model. A candidate word may, for example, have properties rather similar to properties of a pseudo-word, yet, in the context, the candidate word may not be suitable. As a result, using the extended and thus more complete vocabulary, together with a speech model, may result in a better recognition of the words in the speech input. The recognized words are then used to reorder the list of search results 114, e.g., by shifting search results comprising most or all of the recognized words to a higher position in the list 114. The reordering may occur according to the relevance of the search results. The user may thus be provided with a better list of search results, in which the search results best matching the search request are located on top.

In another example, the words in the speech input may be recognized using the extended vocabulary to obtain at least one hypothesis 108, and a search of the database 112 is performed using the at least one hypothesis as a search query, where a new list of search results is obtained. Again, by using the extended vocabulary, better speech recognition may be achieved for the speech input 104, and the hypothesis 108 obtained may generally comprise less or no pseudo-words. All the words in the speech input 104 may be recognized by using the extended vocabulary. The database 112 is then again searched by using the hypothesis 108 containing the recognized words as the search query. As the search query now contains less or no pseudo-words, the search will be more precise and deliver better results. Thus, by first identifying candidate words, most closely corresponding to pseudo-words, and by performing another speech recognition step using a vocabulary including these candidate words, the speech recognition and the search in the database 112 may be improved.

In particular, and as illustrated in FIG. 1, the candidate words included in the list of candidate words 116 are generally not included in a vocabulary used by the speech recognition unit 106 to recognize words in the speech input 104, as they correspond to the not-recognized pseudo-words. The list of candidate words 116 may thus be provided to a first reprocessing unit 122, which extends a vocabulary with the candidate words and performs another speech recognition search. The first reprocessing unit 122 accesses the speech input 104 and recognizes words in the speech input 104 using a vocabulary extended by the candidate words. If candidate words were found for all pseudo-words included in the hypothesis 108 by the search unit 110, the first reprocessing unit 122 should be able to identify all the words of the speech input 104. In other cases, the first reprocessing unit 122 may only be able to identify some of the words included in the speech input 104. Of the several candidate words that may be associated with a pseudo-word, the first reprocessing unit 122 may be able to select the best fitting candidate word, e.g., by using a measure of proximity or by using a speech model to identify the best matching candidate word. The best matching candidate word may be determined, or a matching probability or measure of proximity may be determined for the alternative candidate words. As a result of this recursive process, it may now be known which candidate word best describes the corresponding part of the speech input 104, and thus, the results can be used to reorder the search results in the list of search results 114 according to their relevance. A search result including the best matching candidate word may, for example, be located at the bottom of the list 114, even though it may be a very relevant search result. By identifying the words in the speech input 104 with the new recognition step, it may be determined that the result is in fact very relevant and the result may thus be moved further up the list 114. The extended vocabulary thus enables a better recognition of the speech input 104 by the first reprocessing unit 122, and accordingly, the relevance of the search results can be better judged, and a reordered list of search results 114 is provided.

Similarly, a second reprocessing unit 124 may be supplied with the list of candidate words 116 and may access the speech input 104. The second processing unit 124 then uses a vocabulary extended by the candidate words to perform another speech recognition of the speech input 104, where recognized words are obtained. As the extended vocabulary was used, most of the words of the speech input 104 should be recognized, so that the result generated by the second processing unit 124 should not contain any pseudo-words. In cases where the pseudo-word of the speech input 104 was not found by the search unit 110, the result produced by the second processing unit 124 may still contain pseudo-words. The second reprocessing unit 124 generates a new hypothesis 108 including the recognized words and in some cases pseudo-words. The hypothesis 108 may then be substituted by this new hypothesis, which is then again processed by the search unit 110. As the new hypothesis 108 generally includes fewer pseudo-words than the original hypothesis 108, the search unit 110 will be able to deliver better, more precise search results. The search unit 110 will thus generate a new list of search results 114, which is then displayed to the user.

The first reprocessing unit 122 and the second reprocessing unit 124 may work in the background. For example, the first list of search results 114 is generated by the search unit 110 from the original hypothesis 108. While the first list of search results 114 is displayed to a user, the first reprocessing unit 122 and the second reprocessing unit 124 may perform speech recognition in the background. If a user does not select a result from the list of search results 114 after a predetermined amount of time, the list of search results 114 may be reordered according to the words recognized by the first processing unit 122. After no selection has been made for an additional amount of time by the user, a new search may be performed by using the new hypothesis 108 generated by the second processing unit 124. The new list of search results 114 is then displayed to the user. Alternatively, the user may directly select to reorder the list of search results 114, or to perform a new search using the new hypothesis 108. As a result, the user of the system 100 is provided with an improved list of search results 114.

Even though the database 112 may comprise a large unknown vocabulary, it is possible to find database entries including words not known to the vocabulary, and these words may then be added as candidate words to the vocabulary to extend the vocabulary. This results in an improved speech recognition system, and an improved list of search results 114 being provided to the user. The system 100 of the illustrated implementation thus not only allows the searching of large databases, but also adaptively improves speech recognition. The units 102, 106, 110, 122 and 124 may be implemented as software code executed on a microprocessor. The database 112 may be a local database including files and an index of database entries and/or may also be a remote database, such as the Internet, and may also include a search engine for searching the database, such as Google® or Yahoo!®. The database may then be accessed, for example, through a network connection, e.g., a wireless connection, through Bluetooth, through a mobile telephony network or the similar known method for accessing network communications.

Figure 2:
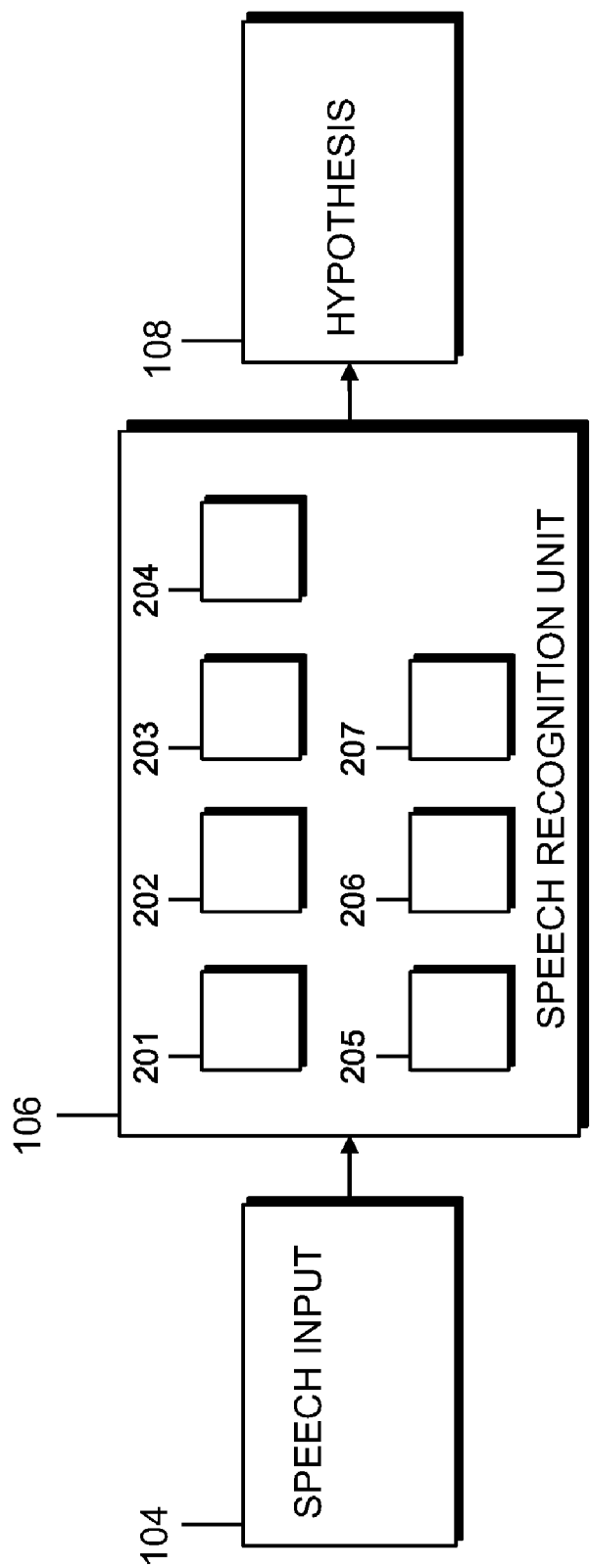
FIG. 2 is a more detailed schematic diagram illustrating the speech input component, speech recognition unit and hypothesis component of the speech recognition system of FIG. 1.

FIG. 2 illustrates a more detailed view the speech input 104 component, speech recognition unit 106 and hypothesis 108 component of the speech recognition system 100 of FIG. 1. The speech recognition unit 106 is supplied with the speech input 104, and generates a hypothesis 108. The speech recognition unit 106 may extract feature vectors from a detected speech input and may use models, such as HMMs, to relate the feature vectors to phonemes. Databases 112 comprising, among others, phoneme models may be provided for different languages. From the recognized phonemes, words can be derived by using an acoustic model based on a vocabulary, and possibly using a speech model. Segments of the speech input 104 not recognized as words are treated as pseudo-words and may also be used to search the database 112. The speech recognition unit 106 may furthermore be formed so as to provide pseudo-word properties associated with pseudo-words, where the search unit 110 is furthermore formed so as to compare the pseudo-word properties to properties derived from database entries and/or entry alternatives when searching the database 112. Entry alternatives may again be orthographic and/or pronunciation alternatives. That way, the database 112 can be searched even for words of the speech input 104 that were not recognized by the speech recognition unit 106.

In the illustrated implementation, a vocabulary 201, 202, 203 and 204 may be utilized to recognize the words of the speech input 104 that includes one or a combination of the following: words obtained from a list of the most commonly used search queries for a database, words obtained from a list of the most commonly spoken search requests, pronunciation alternatives of words, words obtained from user operated applications. Using such a vocabulary provides for words important for a search request to be reliably recognized. Furthermore, by recognizing these words, the search in the database 112 is narrowed in a suitable way, so that it will be easier to find database entries relating to pseudo-words of the speech input. Database entries may, for example, be pre-selected according to the recognized words, whereas it will be easier to find entries relating to the pseudo-words, as only a limited amount of entries have to be searched. Search queries with which a database 112 is searched may be stored and statistically evaluated, resulting in a list of the most commonly used search queries for said database. Words from such a list may then be included into a vocabulary for recognizing words. Similarly, search requests entered by speech into a speech recognition system may be statistically evaluated to form a list of the most commonly spoken search requests. Words from that list may then be used in the vocabulary. In several dialects, or several users may pronounce words in different ways. The vocabulary may thus include pronunciation alternatives of words that enable recognition of speech from even a strong dialect speaker. Furthermore, the vocabulary may comprise words obtained from user operated applications. These words may, for example, be collected every time a user uses an application, such as when writing an e-mail, visiting a website, or from the address book of the e-mail program. Words are collected that may potentially become part of a search request. Building a vocabulary using one or a combination of the above described methods may result in a small but specialized vocabulary, which may be particularly useful for entering search requests by voice.

As illustrated in the example of FIG. 2, the speech recognition unit 106 included a specialized system vocabulary 201, 202, 203 and 204. The speech recognition unit 106 furthermore, includes a general vocabulary (not shown) that may be a basic vocabulary of a system such as a navigation system with speech recognition, or a dictation system such as Dragon® NaturallySpeaking. Specialized system vocabulary 201 includes words that are frequently used in search requests in one or more languages. Such words may, for example, be: "I", "would", "please", "show", "today", "tomorrow", and so on. A list of these most commonly spoken search requests may, for example, be formed by gathering and storing search requests sent to a database. Words from such search requests may be collected over some time and added to the specialized system vocabulary 201 at predetermined times. These words may also include additional semantic information, such as the words "today", "tomorrow", or "search". The semantic information may be evaluated in the speech recognition unit 106.

The specialized system vocabulary 202 includes the present most commonly used search queries of a database, e.g., the database 112. Every time the database 112 is searched, the words included in the search query may be collected and a list of the most commonly used search queries for the database 112 may be formed. The list may be refreshed regularly, and may be stored in a remote location, such as the Internet, or in conjunction with the database 112. The list may be multilingual, and may also include the phonetic of the words of the search requests. The specialized system vocabulary 203 includes words that are obtained by user involvement. These may be words collected from applications that a user uses, such as e-mail programs, visited websites, address books and the like. Words used in these applications have a high probability of becoming part of a search request. Accordingly, words may be collected from user operated applications and added to the vocabulary. The specialized system vocabulary 204 provides pronunciation variants for words. Some words may be pronounced differently in different dialects, so that by providing the vocabulary 204, speech recognition can be improved. By using the specialized vocabulary 201, 202, 203 and 204, the system 100 has access to a vocabulary specialized to recognize search requests by a user. Even though the speech recognition unit 106 may only include a small standard vocabulary, its ability to properly recognize search requests by a user is greatly enhanced by using the specialized vocabulary 201, 202, 203 and 204.

The speech recognition unit 106 furthermore includes an exclusion system vocabulary 205. The exclusion vocabulary 205 is used to exclude words recognized from a search request. A search request may for example be a sentence containing fill words that may not be useful for searching a database. The search vocabulary 205 may include words that are not useful for searching a database, and after a hypothesis 108 was generated by the speech recognition unit 106, words may be excluded from said hypothesis 108 according to the exclusion vocabulary 205. Such words may be fill words, prepositions, and the like. This prevents an unnecessary restriction of the search, and also reduces processing time required during the search.

The speech recognition unit 106 furthermore includes a pseudo-word recognition unit 207. The pseudo-word recognition unit 207 recognizes pseudo-words in the speech input. Not all segments of the speech input, which were converted to a phonetic sequence, may be recognized as words. The remaining unrecognized segments are processed by the pseudo-word recognition unit 207. The pseudo-word recognition unit 207 may first recognize which segments of a phonetic sequence were not recognized as words. For these segments, the unit may then use properties of the acoustic signal to derive a plurality of character sequences. Such a character sequence may already be a proper word, but in most cases, it will by itself not make sense. A character sequence may be a sequence of phonetic characters, yet it may also be a sequence of text characters, e.g., transcribed from phonetic characters. Furthermore, the pseudo-word recognition unit 207 will derive properties from these character sequences, or the so-called pseudo-words. As mentioned above, a property may, for example, be the sequence of vowels and consonants. The pseudo-words and their properties are then included in the hypothesis 108 and supplied to a search unit 110. Plural hypotheses 108 may then be provided, and the hypotheses 108 may be weighted according to a measure of confidence. The measure of confidence describes the confidence with which the speech recognition unit 106 recognizes the words in the speech input 104. As an option, the hypothesis 108 may further include the acoustic signal itself, and it may include semantic information.

Figure 3:
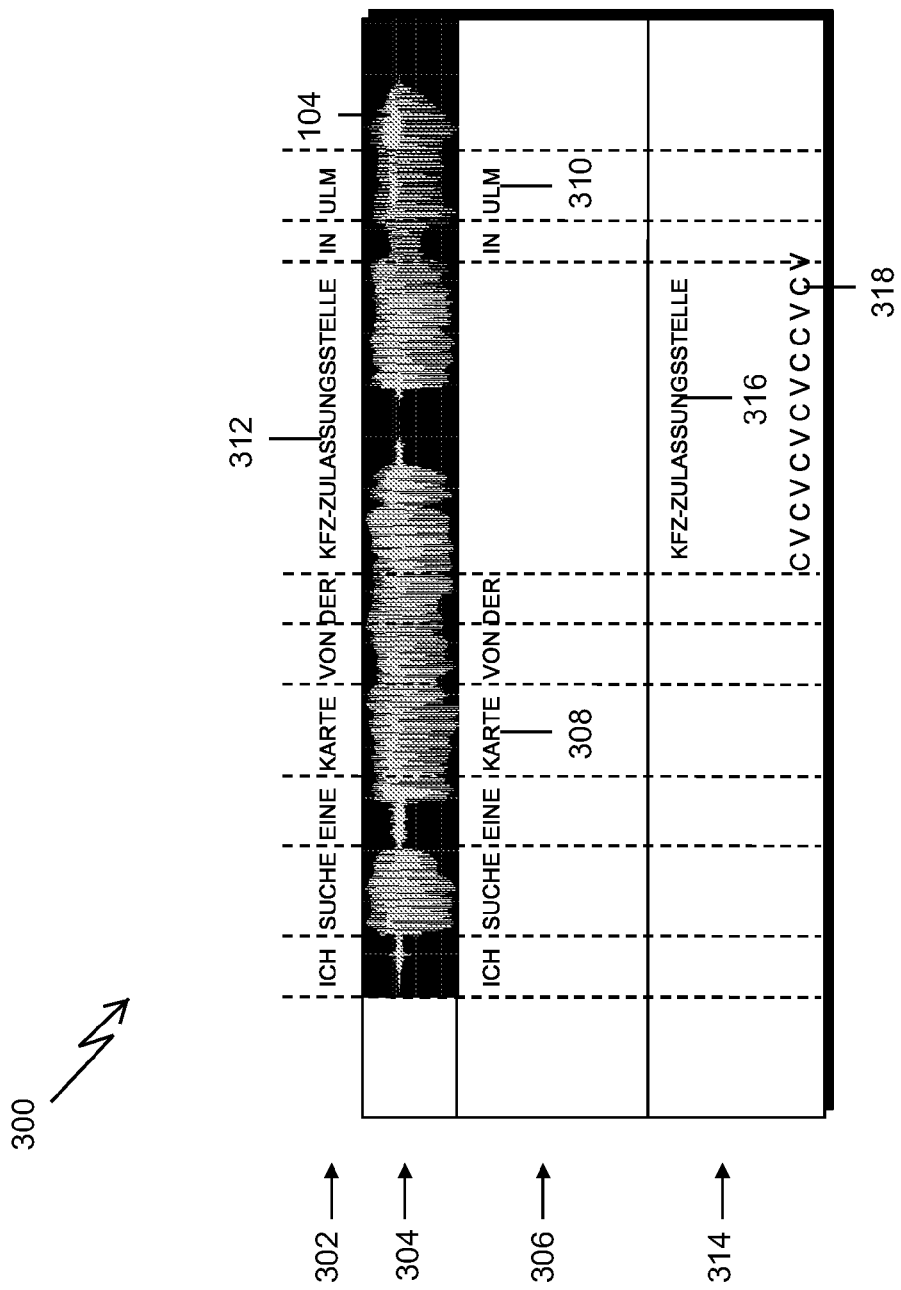
FIG. 3 is a schematic diagram illustrating a speech input, recognized words, recognized pseudo-words and pseudo-word properties form as a hypothesis or as hypotheses.

FIG. 3 is a schematic diagram 300 illustrating a speech input, recognized words, recognized pseudo-words and pseudo-word properties form as a hypothesis 108 or as hypotheses 108 that, as described above, may be supplied to the search unit 106. Row 302 contains a spoken search request, illustrated in written form. A speech input shown in row 304 is provided by the speech recording unit 102 in form of a digitized acoustic signal. Row 304 is an optional part of a hypothesis 108. Row 306 shows the words recognized by the speech recognition unit 106. As the search request was in German, a German vocabulary may be used to recognize words of the speech input 104. By using a specialized vocabulary 202 including the most commonly used search queries, the word 308 ("Karte") is recognized. The word 310 ("Ulm"), which is the name of a location, is recognized by using the user involved specialized vocabulary 203. For example, the user may have written an e-mail in which he states that he wants to travel to "Ulm", as a result of which the system 100 takes up the word "Ulm" into vocabulary 203. The word 312 ("KFZ-Zulassungsstelle") may not be recognized by the speech recognition unit 106. Accordingly, the pseudo-word recognition unit 206 recognizes word 312 as a pseudo-word. The pseudo-word is transcribed into a sequence of characters and shown in row 314. In this example, the sequence of characters correctly represents the spoken word 312, yet, this may generally not be the case. The pseudo-word recognition unit 207 further extracts properties from the pseudo-word 316, for example the sequence of characters and vowels 318. The sequence 318 is only schematically represented here and does not reflect the true vowel and consonant sequence of pseudo-word 316. For the same segment of the speech input 104, the pseudo-word recognition unit 207 may derive more than one pseudo-word 316, i.e., several transcription possibilities. For these, pseudo-word properties are derived. More properties than the vowel consonant sequence 318 shown here may be derived. In the implementation of FIG. 3, the hypothesis 108 is thus made up of the acoustic signal in row 304, i.e., the speech input 104, words in row 306 recognized by the speech recognition unit 106, as well as pseudo-words and pseudo-word properties in row 314. Furthermore, semantic information may be supplied. The speech recognition unit 106 may for example identify that the word "Suche" has the meaning that the user requests a search, and that the word "Karte" means that the user is requesting a map. This information may be used to refine a search by the search unit 110, e.g., the search unit 110 may only search databases including maps. Identifying semantic information can thus be advantageous as it may deliver better search results.

As an example, speech may then be recognized as follows: from the speech input 104 in the form of a digitized signal, the speech recognition unit 106 may extract feature vectors. The speech recognition unit 106 may then use hidden Markov models (HMMs) for phonemes of different languages to transcribe the speech input into a phonetic sequence. Using the vocabulary and the specialized vocabulary 201, 202, 203 and 204, words are then identified in the sequence of phonemes. For several phoneme segments of the phoneme sequence, there may be a number of possible words. The number of possible words can generally be reduced by using a speech model 206. The speech model 206 may, for example, be a rule base or a statistical model, that contains information about in which sequences words occur, e.g., the probabilities for particular word sequences. There are several speech models known to a person skilled in the art, and, as such, will not be discussed in more detail here. Even though a speech model 206 is used, there may still be a plurality of possibilities for describing the phonetic sequence with words, and accordingly, plural hypotheses 108 may be generated.

As illustrated, to recognize words, the speech input 104 may for example be processed by recording the speech input as a speech signal, extracting feature vectors from the speech signal, and identifying phonemes or phoneme sequences in the speech signal by using the feature vectors and hidden Markov models associated with phonemes or phoneme segments. A sequence of phonemes may then be obtained, and words in that sequence may be identified using a vocabulary. In another implementation, HMMs may be provided for words, and words may thus be directly obtained from the feature vectors. Yet, some words of the speech input may not be included in the vocabulary. Feature vectors extracted from this part of the speech input 104 may be converted to phonetic segments or text segments by e.g., using monophone or triphone HMMs. The obtained phonetic segments or text segments can be called pseudo-words. The speech recognition unit 106 may thus transcribe a word of the speech input 104 not comprised in a vocabulary into a character sequence. Processing a word not comprised in the vocabulary of the speech input 104 using HMMs may result in the recognition step delivering plural phonetic segments or text segments with different probabilities of modelling the not-recognized word. Thus, plural pseudo-word hypotheses 108 may be generated for a pseudo-word, resulting in a plurality of hypotheses 108 and search queries. Searching the database 112 using a search query comprising words and pseudo-words may result in database entries being found that are not comprised in a vocabulary used to recognize words in the speech input 144. That way, a large database can be searched by voice even if a speech recognizer with a rather limited vocabulary is utilized. Using plural pseudo-word hypotheses 108 to create plural search queries has the advantage that the chance may be increased to find the database entry requested by the user with the speech input 104. Similarly, a plurality of search queries may be obtained from plural hypotheses 108 for words.

Pseudo-words may be words that are not included in a vocabulary used to recognize words of the speech input. Pseudo-words may also be word fragments, such as syllables, or other kinds of subword units. The speech input may be processed to form a plurality of hypotheses 108. The processing in the speech recognition step unit 106 may include the use of a speech model 206 to recognize words. If a sequence of phonemes was obtained during the speech recognition process, it may be helpful to use a speech model 206 (FIG. 2) to recognize words in the phoneme sequence. It is often difficult to directly associate a phoneme sequence with a word, as different words may be pronounced rather similar, as a result of which it is not possible for a speech recognition unit 106 to precisely identify the correct word. A speech model 206 may, for example, use statistical probabilities of words sequences in order to identify words. Yet, it may also use a rule base model to identify a structure of a sentence, and use this information to recognize words. The use of a speech model 206 may thus improve the correct recognition of words. As a sequence of phonemes may be recognized as different words with different probabilities, these different words may be used as plural hypotheses 108 in the search. When the speech input 104 is processed by e.g., using a speech model 206, several possibilities of identifying words or word sequences may occur, and these may again be used as hypothesis 108. The plural hypotheses 108 can be used as plural search queries, which may increase the chances of finding the database entry requested by the user. By using plural hypotheses 108, cases may be prevented in which a word is incorrectly recognized and used as a hypothesis 108, and, as a result, only database entries comprising the incorrect word are retrieved.

Figure 4:
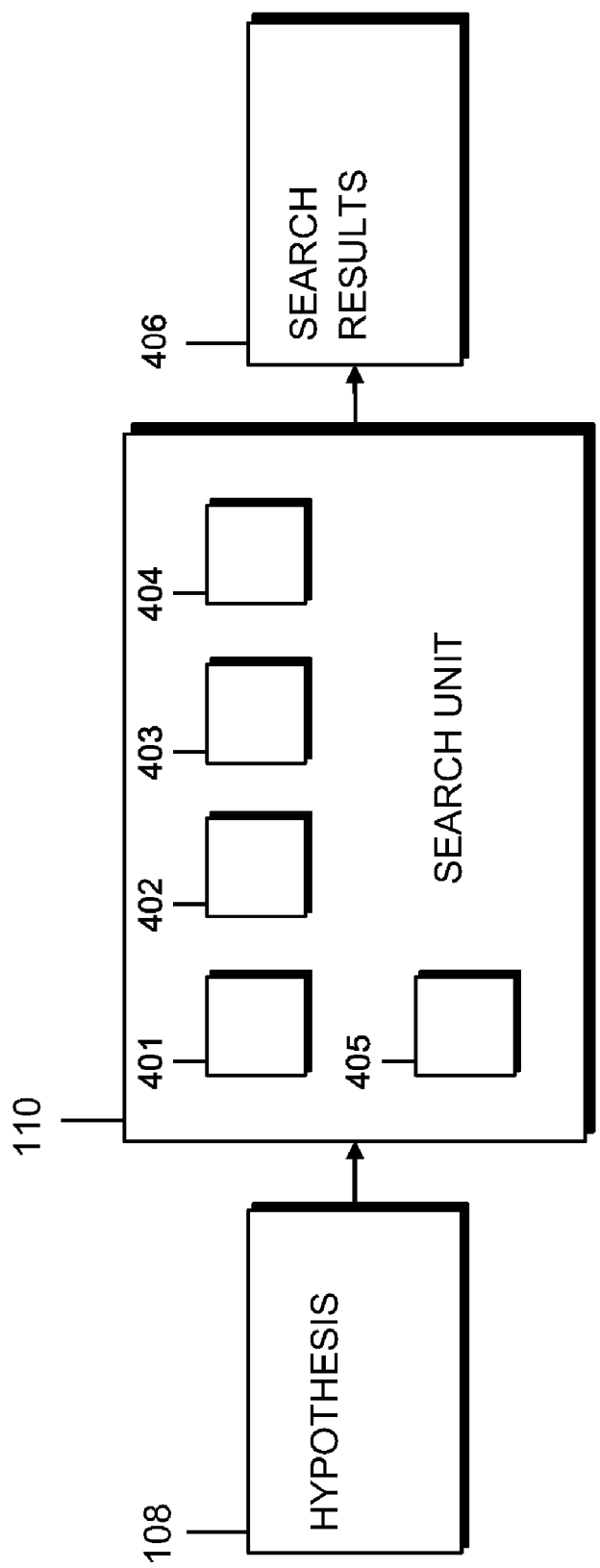
FIG. 4 is a more detailed schematic diagram illustrating the hypothesis component, search unit and search results of the system of FIG. 1.

FIG. 4 shows a more detailed schematic diagram illustrating the hypothesis 108 component, search unit 110 and search results 406 of the system 100 of FIG. 1. Search unit 110 searches a database 112 with words and information included in the hypothesis 108 supplied to the search unit 110. Before performing the search, the search unit 110 pre-processes database entries. Using a language determination unit 401, the language of database entries is determined. If language is known, pronunciation and/or autographic alternatives of database entries may be formed. As in the database 112, the database entries are usually embedded within other words, and thus within a context estimating the language is relatively simple. Estimating the language may be achieved by using a vocabulary, a speech model, or the like. Furthermore, the search unit 110 includes an orthographic alternative forming unit 402 and a pronunciation alternative forming unit 403. Unit 402 may use a dictionary or vocabulary to form orthographic alternatives of database entries. The estimation of the language or the forming of orthographic alternatives of entries may also be performed directly by the database 112. The database 112 may then deliver database entries as well as language information and autographic alternatives. A database entry may be a single word, or a number of words, and forming alternatives includes forming alternatives of one or several words included in a database entry. Of the database entry or entry alternatives, unit 403 forms pronunciation alternatives. This may be performed by using an auto transcription procedure and a pronunciation vocabulary/dictionary, including pronunciation alternatives. Auto transcription may, for example, refer to transcribing words into phonetic characters.

The search unit 110 further includes an exclusion list for pseudo-words. A search may deliver a number of search results including words corresponding to words in the hypothesis 108, and words corresponding to pseudo-words in the hypothesis 108. The words corresponding to pseudo-words are obtained by the search by making use of the formed alternatives and the pseudo-word properties. The results may include several alternative words associated with a pseudo-word, and some of these words may already be included in the vocabulary used by the speech recognition unit 106. As the speech recognition unit 106 did not recognize the pseudo-word, it can be concluded that the corresponding alternative already included in the vocabulary may not be a suitable alternative. Accordingly, this alternative may be excluded from the database entries of the search result. When forming a list of candidate words, the search unit 110 may exclude these words that are already included in the vocabulary from the candidate list. These words are thus not indexed as pseudo-words.

The search unit 110 further includes a comparison unit 405. The comparison unit 405 compares database entries, which may have been pre-processed using one of the above-described methods, with words and pseudo-words included in the search query formed of the hypothesis 108. A search query may contain words and pseudo-words, as well as alternatives included in the hypothesis 108, yet, it may also contain semantic information and pseudo-word properties. The semantic information is used to narrow the search query. Semantic information may include place information or time information, as well as other information that can be derived from words included in the hypothesis 108 that is useful for narrowing the search. From the comparison, search results are generated. Alternatively, the search query may be directly submitted to a database 112 that delivers search results in return. Comparison unit 405 may then be used to further narrow the search results, e.g., by using semantic information.

As a result of the search with the search query, a list of database entries is obtained, including the words found, i.e., words of the search query that were found in the database entries, as well as a list of words found during the search that correspond to pseudo-words. The search unit 110 may also supply the phonetic transcriptions of these candidate words. The results supplied by the search unit 110 are depicted as search results 406 in FIG. 4, which may comprise the list of candidate words 116 and the list of search results 114 of FIG. 1.

As described above, the database 112 is searched using a search method configured to deliver search results 406 including words that are selected by the search method to be most probable words corresponding to the pseudo-words. As the pseudo-words are generally not comprised in the vocabulary used for speech recognition, the pseudo-words may as such not be a proper word, but a more or less meaningless sequence of characters. Yet, this sequence of characters may closely resemble a proper word. For example, only a few characters may be incorrect in the pseudo-word compared to a proper word. The search method identifies database entries comprising words that most probably correspond to the pseudo-words. There may be several words that may correspond to a given pseudo-word, and accordingly, database entries may be delivered comprising these words. Search methods are known in the art that select a word as a most probable word corresponding to an entered pseudo-word and deliver search results comprising said most probable word. One such example is the Google® search system, which delivers results for a correctly spelled word if an incorrectly spelled word is entered. Using such a search method, even though words in the search request may not be recognized by the speech recognition step, the database can be searched for these words. Additionally, even if the pseudo-word itself is not comprised in the database, database entries with words corresponding to the pseudo-word are found.

Such pseudo-word properties may, for example, be the sequence of vowels and consonants, the syllables, syllable separators, word separators, syllable sequences, or grapheme. Furthermore, entry properties from database entries and/or entry alternatives may be derived and compared to the pseudo-word properties to find entries most closely corresponding to the pseudo-words. Entry alternatives may for example be obtained by forming orthographic and/or pronunciation alternatives of database entries. This method of finding a database entry may be helpful in cases where the speech recognition step does not deliver a pseudo-word that orthographically closely corresponds to the word spoken in the search request. Even though the spelling of the pseudo-word may be rather different from the spoken word, which is a result of the spoken word not being comprised in the vocabulary, there may still be a number of properties which relate the transcribed pseudo-word to the spoken word. This may, for example, be the sequence of syllables or vowels and consonants. The spoken word and the corresponding database entry will often have the same properties, and accordingly, the database entry may be found by comparing properties of the pseudo-word and the database entry. To comprise entry alternatives in the extracting of properties, as the spoken word may, for example, be in plural, whereas the database entry is in singular. Alternatives may, for example, comprise conjugations of verbs or declensions of nouns.

Searching the database 112 may furthermore comprise generating pre-processed database entries by forming entry alternatives and comparing the pre-processed database entries with the at least one hypothesis 108. To use alternatives of database entries in the search, as this, may increase the chance of finding database entries comprising declensions, conjugations or the like of words and/or pseudo-words comprised in the search request. As words may be pronounced similarly, particularly by a mumbling speaker, the speech recognition step may identify a spoken word incorrectly, and thus to use pronunciation alternatives of database entries when searching the database 112 in order to find a database entry for the spoken word. Alternatives may be formed in a system 100 using one of the above-described methods to search a database, yet, they may also be delivered by the database, e.g., a search method used to search the database may form the alternatives and deliver them.

Figure 5:
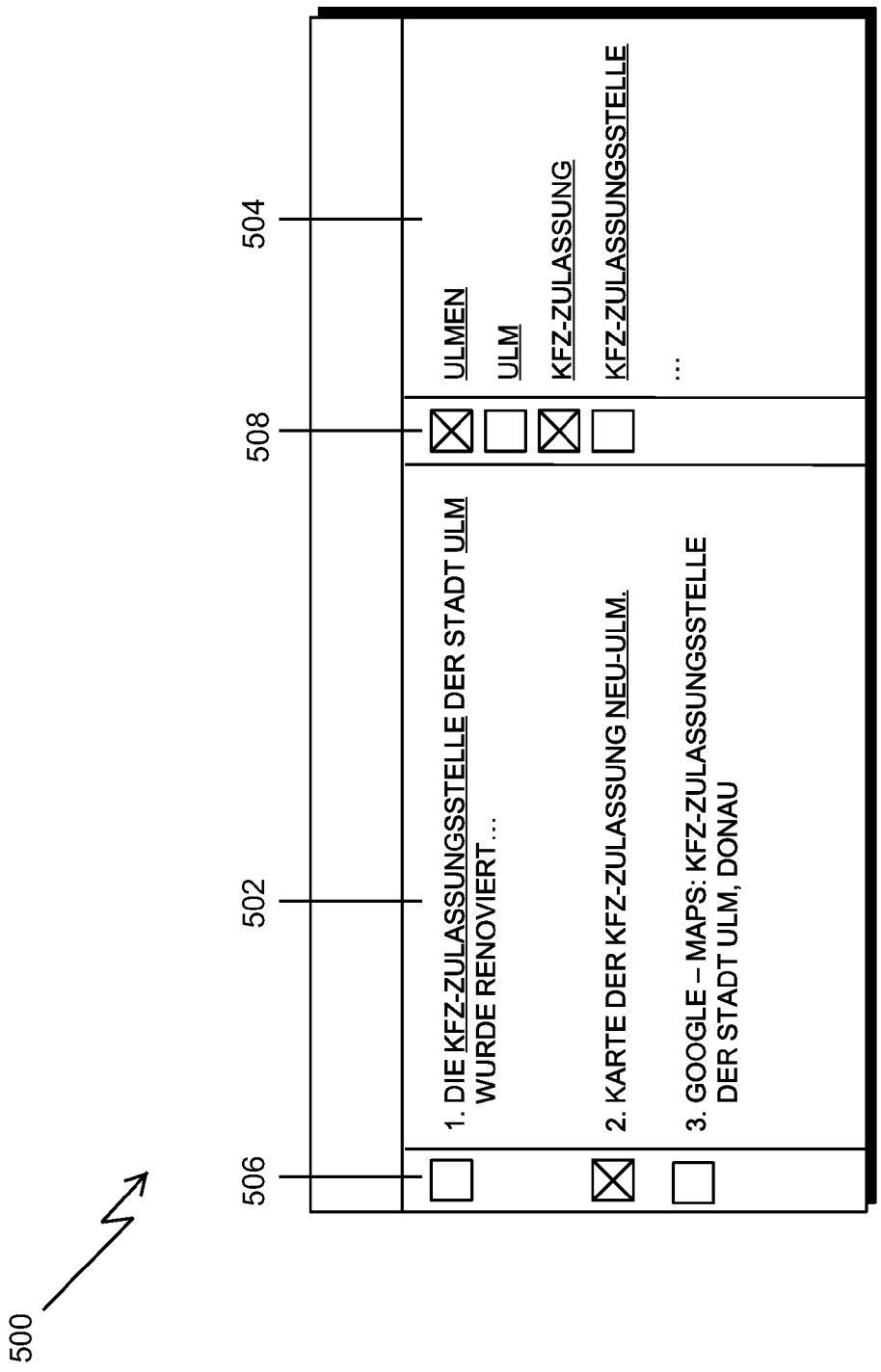
FIG. 5 is an example of a list of search results and list of candidate words produced by the system illustrated in FIG. 1.

FIG. 5 is a schematic representation 500 of a display 118 of search results 406, which shows an example of a list of search results 114 and list of candidate words 116 produced by the system 100 illustrated in FIG. 1. In column 502, search results in the form of database entries are provided. In the database entries, the words that were found in the database entry during the search are highlighted, here by underlining. The search results of FIG. 5 correspond to the search request of FIG. 3. In column 504, found words as well as candidate words are provided. For the word "Ulm", which was recognized in the search request, database entries were found, and accordingly, the word is displayed in column 504. An orthographic alternative is also displayed with the word "Ulmen". Furthermore, for the pseudo-word 316 ("KFZ-Zulassungsstelle") of FIG. 3, the search unit 110 may have found database entries with corresponding candidate words "KFZ-Zulassung" and "KFZ-Zulassungsstelle". These possibilities, for which database entries were found, are also provided to the user in column 504. In columns 506 and 508, the user now has the possibility to devaluate and/or exclude search results or found words/candidate words, respectively. This may be done by a manual input using a control element, or by a voice command via input 120. In FIG. 5, the user has selected the check boxes for the words "Ulmen" and "KFZ-Zulassung" in column 508, as these words were not included in the search request he entered into the system. In a next step, a search may be performed without considering these alternative words, or the search results displayed in column 502 may be reordered, with a new rating of the results being determined without considering the checked words. Similarly, a check box in column 506 is checked for a database entry displayed in column 502 that is to be excluded or devaluated from the list of database entries. The user is thus given the possibility to improve the search by user input, and to obtain better search results.

Figure 6:
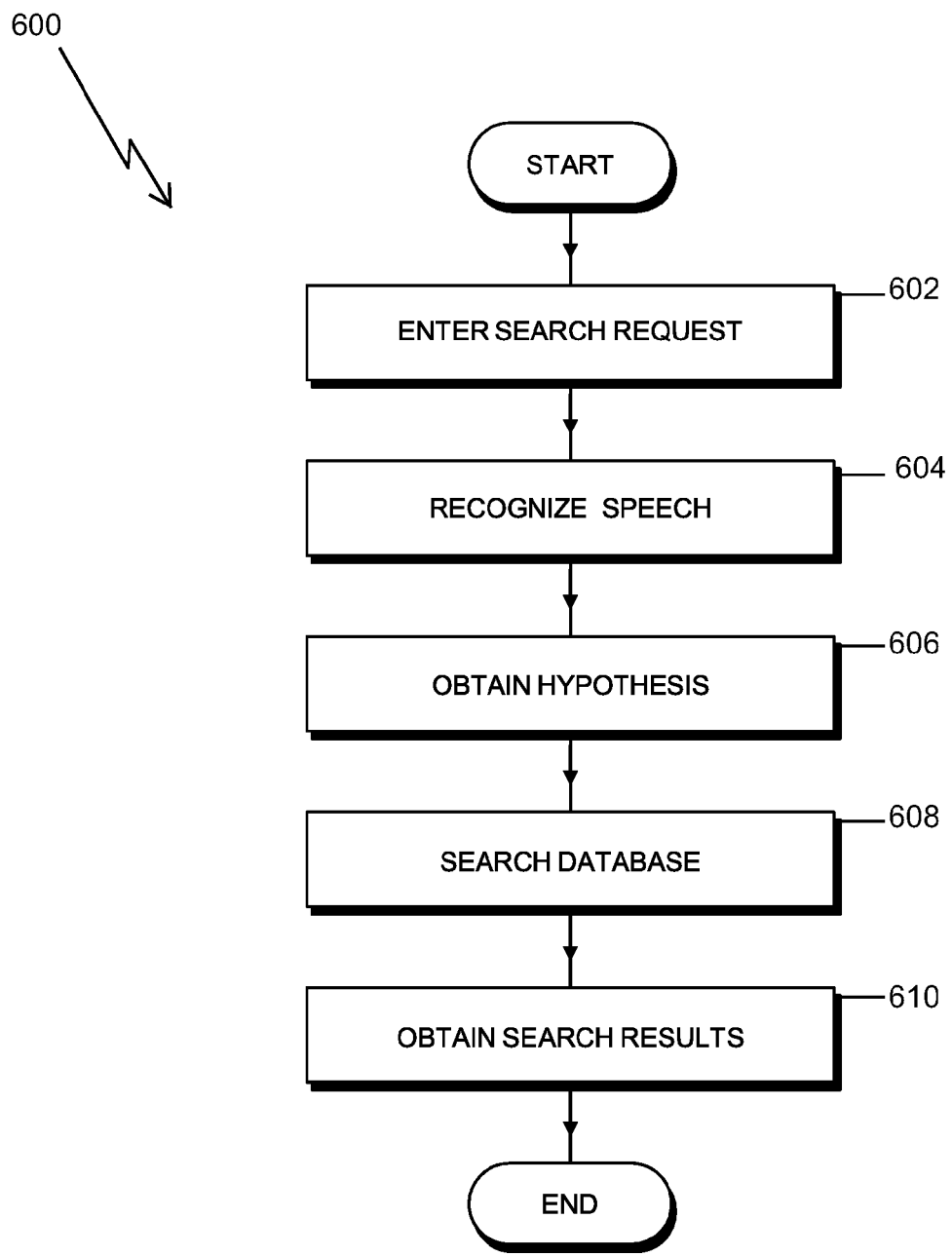
FIG. 6 is a flow diagram of one example of an implementation of a method of recognizing speech for searching a database.

FIG. 6 is one example of an implementation of a method for recognizing speech for searching a database. In a first step 602, a user enters a search request by speaking out the search request, which is then recorded with a microphone and provided in the form of an acoustic signal as speech input. The speech input is then processed to recognize speech in step 604. The speech recognition step 604 delivers one or more hypotheses in step 606. In the speech recognition step 604, words in the speech input 104 are recognized using a vocabulary. Words of the speech input not included in the vocabulary are identified as pseudo-words. Generally, a probability-based method is used for speech recognition. Accordingly, several words may be recognized having different probabilities, and as a result, several hypotheses may be provided in step 606. The hypotheses including words and pseudo-words are then used as a search query for searching a database in step 608. The searched database may be a database internal to the system on which the method for recognizing speech is carried out, e.g., a location database in a navigation system with speech recognition, or a music database in a multimedia system with speech recognition; yet, it may also be an external database such as a database of the Internet. By searching the database in step 608, search results are obtained in step 610. Search results may be obtained as a list of search results 114 including database entries, and optionally, a list of found words 116 may also be provided as a search result. A list of found words 116 is, for example, a list of words that were found in the database in response to the search query. The list of search results 114 is then provided to the user, which may select one of the search results to obtain more information or to perform an action, such as entering a destination into a navigation system or selecting a song from a music database that is to be played back.

Figure 7:
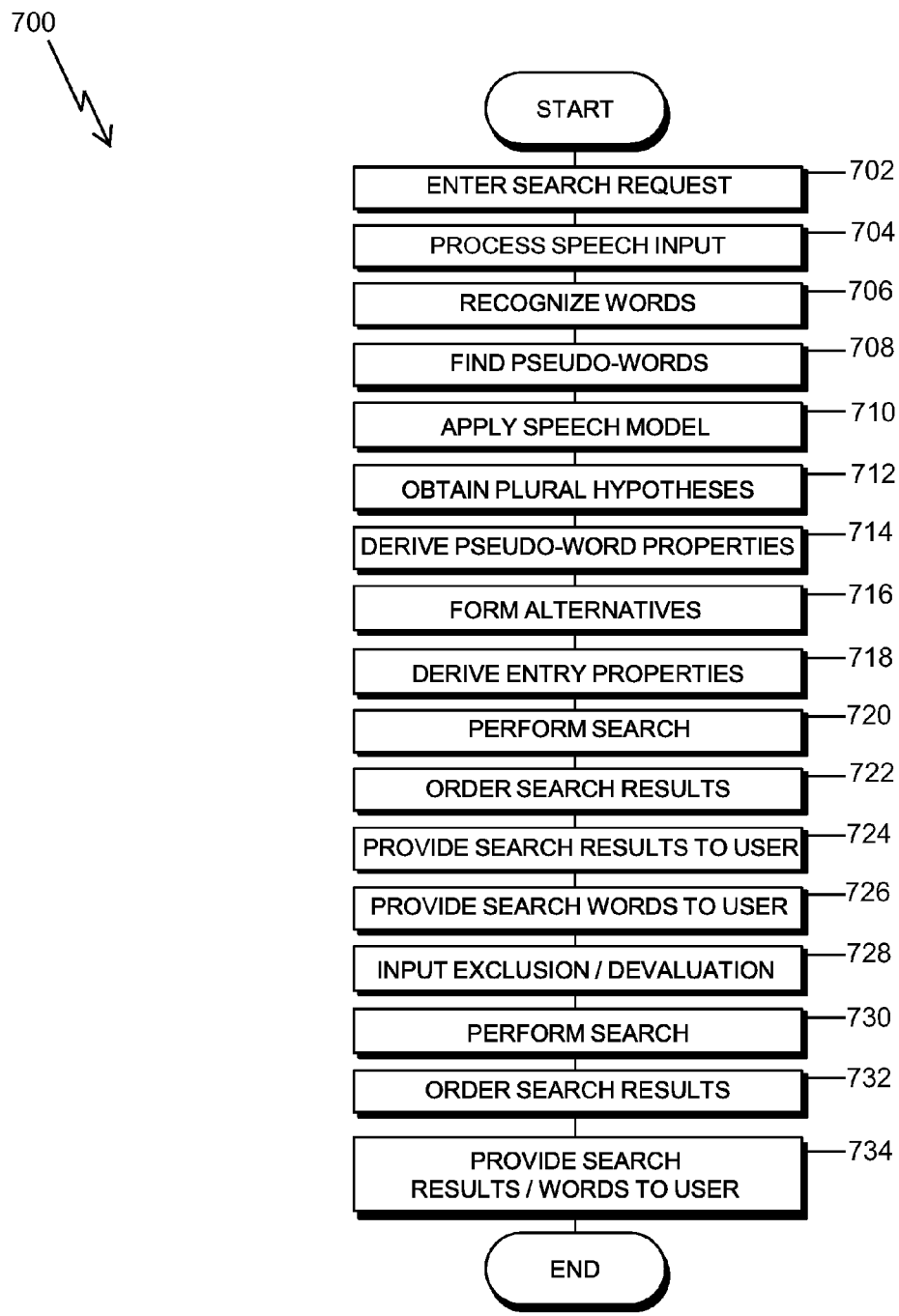
FIG. 7 is a flow diagram of another example of an implementation of a method of recognizing speech for searching a database.

FIG. 7 is another example of an implementation of a method of recognizing speech for searching a database. Again, a search request is entered by a user in step 702, and the speech input in form of the acoustic signal is processed in step 704. Words in the speech input are recognized in step 706. In step 708, pseudo-words are found in the speech input. A speech model is then applied in step 710. By applying a speech model, the number of alternative words that may correspond to a word in the speech input can be limited, as the speech model considers the context of the words and can thus identify which word makes most sense at a particular position. This may be achieved by using a grammatical model for a sentence, or by using statistics of word sequences. Even though a speech model is used in step 710, a plurality of hypotheses may be obtained in step 712. Particularly since there will generally be a plurality of possible character sequences for an identified pseudo-word, several hypotheses are obtained. From the identified pseudo-words, pseudo-word properties are derived in step 714. Furthermore, alternatives, such as pronunciation alternatives, of the words and/or pseudo-words are formed in step 716. In step 718, properties of database entries are derived. For the properties derived from pseudo-words, corresponding properties may be derived from database entries. In step 720, a search is then performed, e.g., by comparing words within the database entries with words of the search query formed from the plural hypothesis, and/or by comparing database entry properties with pseudo-word properties. The search delivers a list of search results, which is then ordered in step 722. The hypotheses that are provided in step 712 may be weighted, e.g., according to some measure of confidence that indicates how confident the speech recognition process is that the hypothesis corresponds to the entered search request. As the several hypotheses are weighted differently, search results obtained by using a particular hypothesis may also be weighted correspondingly. This ensures that search results that are obtained using a hypothesis with a high measure of confidence as a search query are weighted such that the weighting indicates their relevance. A higher weight may, for example, be assigned to more relevant search results, i.e., search results based on high confidence search queries or search results including a large number of words of the search query. According to their relevance and thus to their weight, the search results are ordered in step 722. The search results are then provided to the user in step 724. In step 726, found words, i.e., words of the search query found in the database entries, are provided to the user. In a next step 728, the user excludes or devaluates search results or found words. The so-modified list of found words may then be used in step 730 to perform a new search, the search results of which are then again ordered in step 718 and provided to the user in step 734. If only search results were excluded or devaluated may step 730 be skipped and the list of search results may simply be reordered in step 732. Similarly, the new list of found words created by the user in step 728 may simply be used to reorder the search results in step 732 and provide these to the user in step 734. The user is thus provided with means that may improve the search and obtain more accurate search results.

Figure 8:
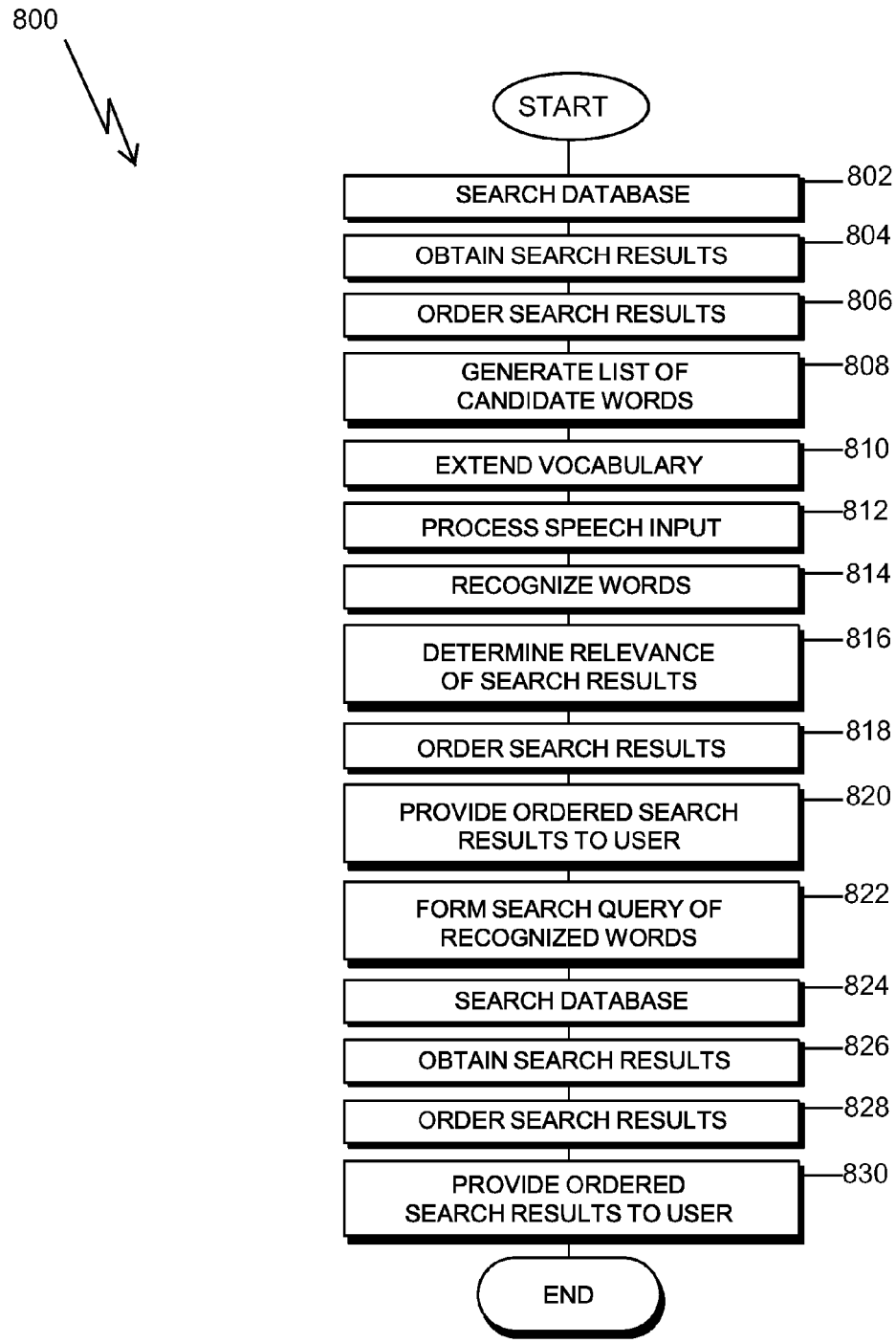
FIG. 8 is a flow diagram of another example of an implementation of a method of recognizing speech for searching a database.

FIG. 8 is yet another example of a flow diagram of another implementation of a method for recognizing speech for searching a database. In particular, FIG. 8 is a flow diagram of how a first search result may be further processed. The first step 802 of FIG. 8 may be performed after step 718 of FIG. 7 or step 606 of FIG. 6. In step 802, the database is searched, using a search query including words and pseudo-words. Search results are obtained in step 804. The search results may include a list of database entries, e.g., links, as well as a list of the words found during the search, and candidate words. The list of search results is ordered in step 806. In step 808, a list of candidate words is generated. The candidate words may be delivered from the search engine utilized to search the database for pseudo-words, yet, may also be extracted from the list of search results by comparing the search results to pseudo-words, or entry properties to pseudo-word properties. Using the list of candidate words, a vocabulary used to identify words in a speech input is extended with the list of candidate words in step 810. Alternatively, an extended vocabulary including only the found words and the candidate words may be utilized. Extended in that sense means that the vocabulary includes words corresponding to pseudo-words. In a next step 812, the speech input is processed. Processing may for example occur in a processing unit, such as the first reprocessing unit 122 of FIG. 1. During processing, words comprised in the speech input are recognized in step 814 by using the extended vocabulary. Furthermore, a speech model may be used to better assign words of the vocabulary to the words included in the speech input. As a result, a recognizing of even the previously unrecognized pseudo-words may be enabled. Using the recognized words, and possibly a measure of confidence for the recognition, the relevance of the search results, which were obtained in step 804, is determined in step 816. The relevance may for example be determined by the number of words of the speech input included in a search result, or by the measure of confidence associated with the found words included in a search result. There are several ways to determine the relevance of a search result known to a person skilled in the art, any of which may be utilized. In step 818, the search results are ordered according to their relevance. In step 820, the ordered search results are provided to the user. The ordering may occur in such a way that the most relevant search results are provided to the user first. The search results may, for example, be provided in form of a graphical display of a list of search results, with the most relevant search results being displayed on top of the list. Yet, they may also be provided to the user in form of a speech output, e.g., using a text-to-voice system. By using the extended vocabulary, a better recognition of the words in the speech input, and a more precise determination of the actual words included in the input may become possible, and as a result, the determination of the relevance of search results may be improved. The ordering of the search results may thus be enhanced, and the more relevant results may be provided to the user first.

In a next step 822, a new search query is formed of the recognized words, i.e., the words recognized in step 814 using the extended vocabulary. In step 824, the database is searched using the new search query. As the extended vocabulary enables a better recognition of words included in the speech input, the new search query will better correspond to the search request of the user, and accordingly, better search results may be obtained by searching the database again in step 824. In step 826, search results are obtained. These search results are again ordered according to their relevance in step 828. The ordered search results are provided to the user in step 830. As a new search query was used, the search results now include new search results, which were not obtained in step 804. The reason is that for the search in step 802, the search query included pseudo-words, which are often no proper words. Yet, by searching the database in step 824 with the new search query, the new search query only including proper words such as found words or candidate words, better search results may be obtained. In cases where no appropriate candidate word was obtained for a pseudo-word, the new search query may still include a pseudo-word. The steps 810 to 820 and 822 to 830 may be performed as background processes, while the first list of search results is provided to the user. With a time delay, better search results may then be provided in step 820, and in step 830. Whereas step 820 may provide better search results in form of a better order, step 830 may provide better search results as it may include new search results.

It should be clear that the different aspects and features of the implementations of the presently described invention may be combined, or that features which are not essential to the invention are only optional and may be left out. For example, in the implementation of FIG. 8, steps 816 to 820 may be left out, or the implementation of FIG. 8 may be combined with the manual exclusion and devaluation of the implementation of FIG. 7. In summary, the described invention enables the search of a large database with speech recognition, even if only a very limited vocabulary is used for speech recognition.

It will be understood, and is appreciated by persons skilled in the art, that one or more processes, sub-processes, or process steps described in connection with FIGS. 1-8 may be performed by hardware and/or software. If the process is performed by software, the software may reside in software memory (not shown) in a suitable electronic processing component or system such as, one or more of the functional components or modules schematically depicted in FIGS. 1-8. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Accordingly, software may be provided in the form of a computer program that may be loaded into the internal memory of a computer, where the software includes programs for performing any of the above described methods. The computer program can be provided on a data carrier, and may be executed using a microprocessor of a computer. An electronically readable data carrier may further be provided with stored electronically readable control information configured such that when using the data carrier in a computer system, the control information performs one of the above-mentioned methods.

The foregoing description of implementations has been presented for purposes of illustrations and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method of recognizing speech for searching a database, where a user enters a search request as a speech input, comprising the following steps:
   processing the speech input in a speech recognition step, by:
   determining a phonetic sequence having a plurality of segments for the speech input,
   recognizing words associated with a portion of the segments using a vocabulary,
   associating the remaining segments with pseudo-words wherein pseudo words are graphemes, and
   obtaining at least one hypothesis comprising recognized words and the pseudo-words not recognized as words within the vocabulary used to recognize words of the speech input; and
   searching the database using the at least one hypothesis as a search query, and obtaining a list of search results from the database search.

2. The method of claim 1, where processing the speech input obtains a plurality of hypotheses.

3. The method of claim 1, where the speech recognition step includes the use of a speech model to recognize words.

4. The method of claim 1, where a plurality of pseudo-word hypotheses are generated for a pseudo-word, resulting in a plurality of hypotheses and search queries.

5. The method of claim 1, wherein the vocabulary includes one or a combination of the following: words obtained from a list of the most commonly used search queries for a database, words obtained from a list of the most commonly spoken search requests, pronunciation alternatives of words, words obtained from user operated applications.

6. The method of claim 1, where an exclusion vocabulary is utilized to process the speech input and to exclude words from the at least one hypothesis.

7. The method of claim 1, where processing the speech input further comprises the step of deriving pseudo-word properties for a pseudo-word.

8. The method of claim 7, where searching the database comprises deriving entry properties from database entries and comparing the pseudo-word properties with the entry properties to find entries most closely corresponding to the pseudo-words.

9. The method of claim 8, where searching the database comprises generating pre-processed database entries by forming entry alternatives and comparing the pre-processed database entries with the at least one hypothesis.

10. The method of claim 8, where entry alternatives are obtained by forming orthographic or pronunciation alternatives of database entries.

11. The method of claim 1, further comprising the steps of estimating the language of words comprised in the at least one hypothesis and performing the search in the database taking into account the estimated language.

12. The method of claim 1, further comprising the step of identifying semantic information in the speech input and performing the search taking into account the semantic information.

13. The method of claim 1, where the search results are weighted in the list of search results, and that the search results are provided to the user according to their weighting.

14. The method of claim 1, further comprising the step of identifying candidate-words in the list of search results as most probable words corresponding to the pseudo-words.

15. The method of claim 14, further comprising the step of providing an extended vocabulary including the candidate words.

16. The method of claim 15, further comprising the steps of recognizing words in the speech input using the extended vocabulary and reordering the list of search results taking into account the recognized words, where a new list of search results is obtained.

17. The method of claim 16, where the new list of search results is provided to the user after a predetermined amount of time.

18. The method of claim 15, further comprising the steps of recognizing words in the speech input using the extended vocabulary to obtain at least one hypothesis, and performing a search of the database using the at least one hypothesis as a search query, where a new list of search results is obtained.

19. The method of claim 1, further comprising the step of excluding or devaluating search results or words included in the search query by user input.

20. The method of claim 1, where the database is searched using a search method configured to deliver search results including words that are selected by the search method to be most probable words corresponding to the pseudo-words.

21. A system for recognizing speech for searching a database, comprising:
- a speech recognition unit detecting a search request of a user in form of a speech input, the speech recognition unit being formed so as to recognize the speech input by:
- determining a phonetic sequence having a plurality of segments for the speech input,
- recognizing words associated with a portion of the segments using a vocabulary,
- associating the remaining segments with pseudo-words wherein pseudo words are graphemes,
- and obtaining at least one hypothesis including recognized words and pseudo-words not recognized as words;
- a database; and
- a search unit searching the database using the at least one hypothesis as a search query, where a list of search results is obtained from the search.

22. The system of claim 21, where the search unit is formed so as to provide a list of candidate words that are included in the search results and associated with pseudo-words of the hypothesis.

23. The system of claim 22, further including a first reprocessing unit formed so as to recognize words in the speech input using an extended vocabulary including the candidate words and to reorder the list of search results depending on the result of the recognition.

24. The system of claim 22, further including a second reprocessing unit formed so as to recognize words in the speech input using an extended vocabulary including the candidate words to obtain at least one hypothesis, and to provide said hypothesis to the search unit to be utilized as a search query.

25. The system of claim 21, where the speech recognition unit is furthermore formed so as to provide pseudo-word properties associated with pseudo-words, where the search unit is furthermore formed so as to compare the pseudo-word properties to properties derived from data base entries or entry alternatives when searching the database.

* * * * *